United States Patent
Kim et al.

(10) Patent No.: US 12,172,294 B2
(45) Date of Patent: Dec. 24, 2024

(54) MULTI SERVING ROBOT OPERATION METHOD AND SYSTEM

(71) Applicant: B-ROBOTICS CO., LTD., Seoul (KR)

(72) Inventors: Myung Sik Kim, Suwon-si (KR); Jin Seok Park, Seoul (KR)

(73) Assignee: B-ROBOTICS CO., LTD., Seoul (KR)

( * ) Notice: Subject to any disclaimer, the term of this patent is extended or adjusted under 35 U.S.C. 154(b) by 0 days.

(21) Appl. No.: 17/913,837

(22) PCT Filed: Mar. 22, 2021

(86) PCT No.: PCT/KR2021/003508
§ 371 (c)(1),
(2) Date: Sep. 23, 2022

(87) PCT Pub. No.: WO2021/194194
PCT Pub. Date: Sep. 30, 2021

(65) Prior Publication Data
US 2024/0217113 A1 Jul. 4, 2024

(30) Foreign Application Priority Data

Mar. 25, 2020 (KR) .......................... 10-2020-0036488
Mar. 15, 2021 (KR) .......................... 10-2021-0033120

(51) Int. Cl.
*B25J 9/16* (2006.01)
*B25J 11/00* (2006.01)

(52) U.S. Cl.
CPC ........... *B25J 11/008* (2013.01); *B25J 9/1664* (2013.01); *B25J 11/0045* (2013.01)

(58) Field of Classification Search
CPC .... B25J 11/008; B25J 11/0045; B25J 9/1664; G06Q 50/12; G06Q 10/06316
See application file for complete search history.

(56) References Cited

U.S. PATENT DOCUMENTS 5,697,064 A * 12/1997 Okamoto .............. H04W 24/00
455/435.2
8,078,506 B1 * 12/2011 Rao ................... H04M 1/72409
705/26.62
(Continued)

FOREIGN PATENT DOCUMENTS

JP 4348276 10/2009
JP 2010231698 10/2010
(Continued)

OTHER PUBLICATIONS

Notice of Reasons for Refusal issued in Japanese Patent Application No. 2022-556489 mailed Autust 15, 2023 (4 pages).
(Continued)

*Primary Examiner* — Dalena Tran
(74) *Attorney, Agent, or Firm* — Osha Bergman Watanabe & Burton LLP (57) ABSTRACT

Disclosed are a multi serving robot operation method and a system therefor. The multi serving robot operation method, according to one embodiment of the present invention, comprises the steps in which: on the basis of serving spot information, related to respective serving spots on tables to be served, and movement paths on which serving robots may move, the multi serving robot operation system stores serving zone information for each of a plurality of predetermined serving zones, wherein the serving zone information includes information on a plurality of serving spots which have been grouped according to a predetermined method; on the basis of the serving zone information, the multi serving robot operation system determines whether a plurality of performing robots, among the serving robots, are same-zone performing robots performing serving in the same first serving zone; and, as a result of the determination, if the plurality of performing robots are same-zone performing robots, the multi serving robot operation system changes a (Continued)

table to be served by at least one of the same-zone performing robots, or changes a serving order.

18 Claims, 6 Drawing Sheets

(56) References Cited

U.S. PATENT DOCUMENTS

| | | | |
|---|---|---|---|
| 11,338,438 B2 | 5/2022 | Ha | |
| 11,370,123 B2 | 6/2022 | Lee | |
| 2006/0095160 A1 | 5/2006 | Orita et al. | |
| 2009/0228325 A1* | 9/2009 | Simmons | G06Q 30/0201 |
| | | | 705/7.23 |
| 2016/0101940 A1 | 4/2016 | Grinnell et al. | |
| 2019/0270204 A1 | 9/2019 | Kawamura et al. | |
| 2020/0047337 A1* | 2/2020 | Williams | B25J 9/1676 |
| 2020/0047343 A1* | 2/2020 | Bal | B25J 9/1689 |
| 2020/0302391 A1* | 9/2020 | Li | G06Q 10/0875 |

FOREIGN PATENT DOCUMENTS

| | | |
|---|---|---|
| JP | 2019-191715 A | 10/2019 |
| KR | 10-2011-0026776 | 3/2011 |
| KR | 10-2015-0137166 | 12/2015 |
| KR | 10-2019-0106910 | 9/2019 |
| KR | 10-2020-0092857 | 8/2020 |

OTHER PUBLICATIONS

Extended European Search Report issued in European Patent Application No. 21774954.8 mailed Mar. 22, 2024 (13 pages).

* cited by examiner

MULTI SERVING ROBOT OPERATION METHOD AND SYSTEM

CROSS REFERENCE TO RELATED APPLICATION

This application is a National Stage Entry of PCT/KR2021/003508, filed on Mar. 22, 2021, and claims priority from and the benefit of Korean Patent Application No. 10-2020-0036488, filed on Mar. 25, 2020 and Korean Patent Application No. 10-2021-0033120, filed on Mar. 15, 2021, each of which is hereby incorporated by reference for all purposes as if fully set forth herein.

BACKGROUND

Field

Embodiments/implementations of the invention relate generally to a multi serving robot operation method and a system therefor, and more particularly, to a technical idea for preventing overlapping of movement paths and collisions of a plurality of serving robots and efficiently operating the serving robots when it is required to operate the plurality of serving robots, such as in a large store.

Discussion of the Background

With development of autonomous driving and robot technology, research is being actively conducted to serve food in stores such as restaurants with a serving robot.

The serving robot travels along a predetermined path in a store on behalf of a person, or recognizes obstacles on the traveling path, loads cooked food, and serves customers.

Such a serving robot is mainly provided in a food service establishment (hereinafter referred to as a "store") to perform predetermined functions. To this end, the serving robot creates a map including a moving route within the store, and the stop position and direction of the serving robot are specified in advance.

In the case of a large store with a large area, it is difficult to meet the demand with only one serving robot, so it is necessary to operate a plurality of serving robots.

Even if the area is wide, movement paths of the serving robots are limited, and thus, there is an issue in that the efficiency may be greatly reduced due to securing a space for movement of the serving robots, overlapping of movement paths among the serving robots, collision, and the like.

Therefore, in a related art, when a plurality of serving robots are operated, a method is mainly used in which the remaining serving robots stand still and wait until operation of a serving robot that moved first is finished. An example of this is shown in FIG. 1 to FIG. 3.

Figure 1:
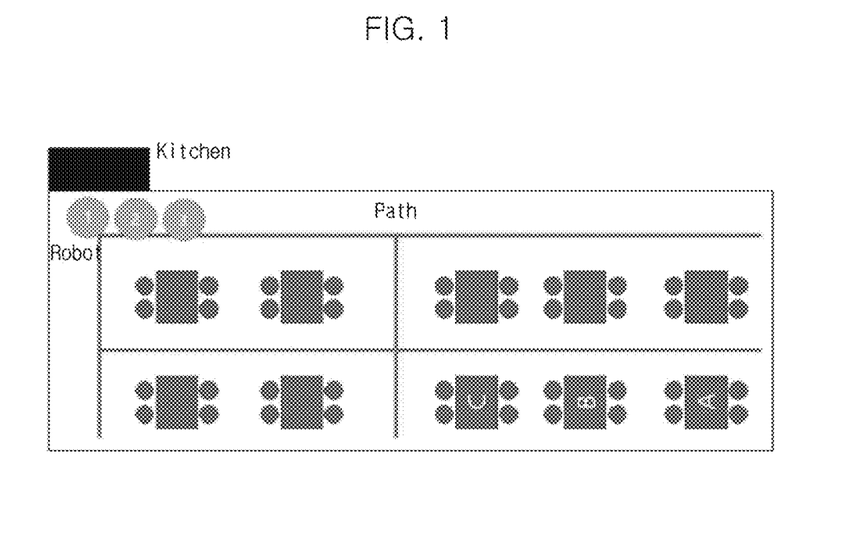
FIG. 1 to FIG. 3 are diagrams for explaining a case in which movement paths of a plurality of serving robots overlap according to the related art.
Figure 2:
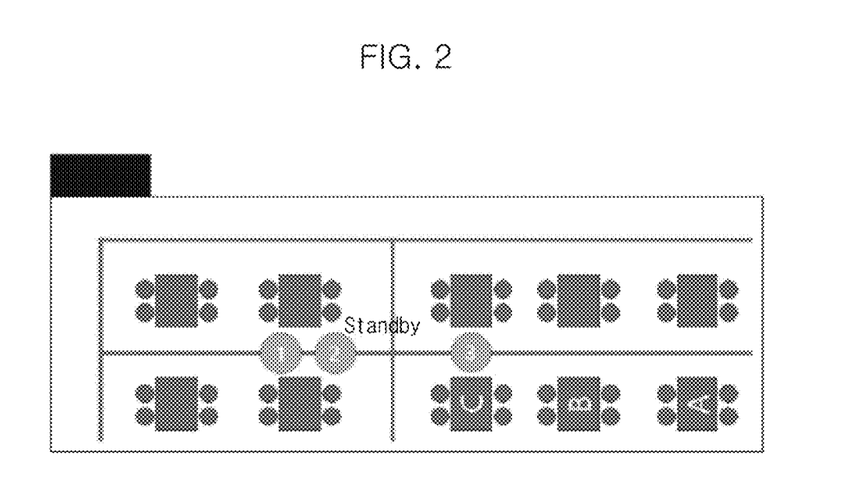
Figure 3:
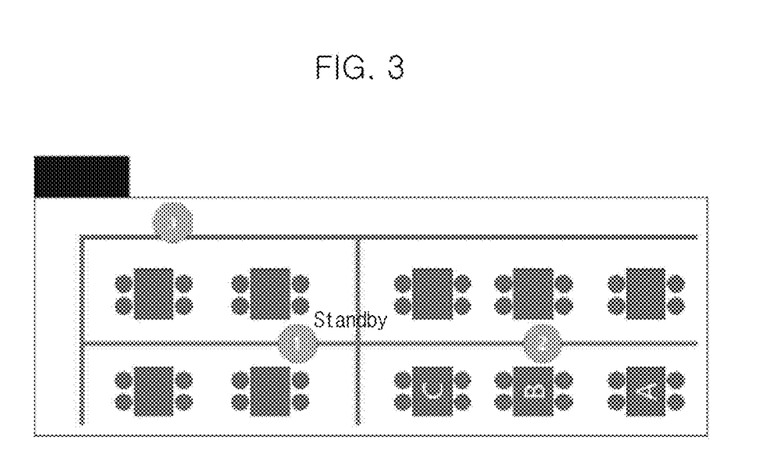

FIG. 1 to FIG. 3 are diagrams illustrating a method according to related art in which a plurality of serving robots wait when movement paths of the serving robots overlap.

Referring to FIG. 1, a case where serving robots 1, 2, and 3 serve tables A, B, and C, respectively, is shown.

In this case, each of the serving robots 1, 2, and 3 may be set to move on a movement path indicated by a solid line, and serving order may be determined among the serving robots.

The serving order may be particularly important when only one robot can move along the movement, and, for example, the order may be determined in the order of 3, 2, 1 according to an order in which food comes out of the kitchen or a predetermined manner.

The serving order may be variously determined. For example, the serving order may be determined by designating a pickup point at which the serving robot picks up food for each table area, and the serving robots wait and pick up food at the pickup point corresponding to the designated area.

Alternatively, food may be automatically moved from the kitchen to the hall according to the serving order of the serving robots, and a clerk may sequentially load the food onto the serving robot according to the order in which the food is served.

The serving order may be determined in various ways, and as shown in FIG. 2, the serving robot 3 having the fastest serving order first serves the table C, and during this, the serving robots 1 and 2 have to wait because the movement path is blocked by the serving robot 3 while the serving robot 3 is serving.

Further, as shown in FIG. 3, the next serving robot 2 serves, and even at this time, the serving robot 2 waits until its own order.

In the case that there is a limit to the number of serving robots that can move simultaneously depending on the movement path, there may be a very large difference in the overall serving time depending on the serving order among the serving robots and/or which table the serving robot will serve. Further, in the case that the operation of the serving of the serving robots is not efficient, there is an issue in that standby time for the table to be served increases and the time it takes to serve increases, which may cause customer dissatisfaction, and the quality of service may be deteriorated as the food to be served to customers during the standby time may be cooled or contaminated.

Therefore, there is a need for a technical idea that allows a plurality of serving robots to be operated more efficiently.

PRIOR ART DOCUMENT

Patent Document (Patent Document) Korean Patent Application No. 1020190144402 ("METHOD, SYSTEM AND NON-TRANSITORY COMPUTER-READABLE RECORDING MEDIUM FOR DETERMINING A MOVEMENT PATH OF A ROBOT")

The above information disclosed in this Background section is only for understanding of the background of the inventive concepts, and, therefore, it may contain information that does not constitute prior art.

SUMMARY

An object to be solved by the present disclosure is to provide a technical idea capable of reducing an overall serving time by efficiently operating a plurality of serving robots that need to move simultaneously in a large store.

In particular, an object of the present disclosure is to provide a technical idea capable of efficiently operating a plurality of serving robots in the case that if a serving robot performing serving exists, other serving robots may not move to a position corresponding to the serving robot due to the nature of a moving path.

Technical Solutions

A multi serving robot operation method according to an example embodiment for solving the above technical issues includes storing, by a multi serving robot operation system, serving spot information about a serving spot of each table to be served and serving zone information about each of a plurality of serving zones set previously based on movement paths along which the serving robots are movable, the serving zone information including information about a plurality of serving spots grouped in a predetermined manner, determining, by the multi serving robot operation system, whether a plurality of performing robots among the serving robots are same-zone performing robots to serve in a same first serving zone based on the serving zone information, and changing, by the multi serving robot operation system, at least one serving table or serving order of the same-zone performing robots, when the plurality of performing robots are the same-zone performing robots as a result of the determination.

The serving zone information may indicate information obtained by grouping serving spots in the case that there is at least one second spot affected by movement when serving is performed at any one first serving spot included in a specific serving zone, and the serving spots include the first serving spot and the at least one second serving spot.

The multi serving robot operation method may include determining, by the multi serving robot operation system, whether a standby event occurs in at least one same-zone performing robot when serving is performed in serving order based on the serving order among the same-zone performing robots, wherein at least one serving table or the serving order of the same-zone performing robots may be changed when it is determined that the standby event occurs.

The changing of the at least one of the serving table or the serving order of the same-zone performing robots may include substitutively allocating, by the multi serving robot operation system, a replacement serving case that is a serving case included in a serving standby list and included in a serving zone different from the first serving zone to a first performing robot that is any one of the same-zone performing robots.

The multi serving robot operation method may further include registering, by the multi serving robot operation system, an original assigned serving case which is originally assigned to the first performing robot as a priority serving case of the serving standby list.

The substitutively allocating, by the multi serving robot operation system, of the replacement serving case that is a serving case included in the serving standby list and included in the serving zone different from the first serving zone to the first performing robot that is any one of the same-zone performing robots may include selecting the replacement serving case based on a priority or frequency of the serving zone when there are a plurality of replacement candidate serving cases included in the different serving zone in the serving standby list.

The changing, by the multi serving robot operation system, of the at least one serving table or the serving order of the same-zone performing robots, when the plurality of performing robots are the same-zone performing robots as a result of the determination may include changing a serving order of a first same-zone performing robot having a low priority serving order of the serving order among the same-zone performing robots to a serving order faster than at least one second same-zone performing robot having a higher priority serving order faster than the first same-zone performing robot.

The multi serving robot operation method may further include maintaining, by the multi serving robot operation system, information about at least one temporary standby zone in which the serving robot is able to temporarily stand for each serving zone. The changing of the serving order of the first same-zone performing robot having the low priority serving order of the serving order among the same-zone performing robots to the serving order faster than the at least one second same-zone performing robot having the higher priority serving order faster than the first same-zone performing robot may include controlling, by the multi serving robot operation system, the first same-zone performing robot to perform serving after moving the second same-zone performing robot to at least one first temporary zone corresponding to the first serving zone.

A multi serving robot operation method according to another aspect of the present disclosure includes storing, by a multi serving robot operation system, serving spot information about a serving spot of each table to be served and serving zone information about each of a plurality of serving zones set previously based on movement paths along which the serving robots are movable, the serving zone information including information for identifying that, in the case that there is at least one second spot affected by movement when serving is performed at any one first serving spot included in a specific serving zone, the first serving spot and the at least one second serving spot are included in the specific serving zone, checking, by the multi serving robot operation system, a serving zone corresponding to each of a plurality of performing robots among the serving robots based on the serving zone information, and adaptively controlling, by the multi serving robot operation system, at least one of movement paths or serving order of the plurality of performing robots based on a result of checking the serving zone corresponding to each of the plurality of performing robots.

The above method may be implemented by a computer program stored in a non-transitory computer-readable recording medium.

A multi serving robot operation system according to another aspect of the present disclosure includes a processor and a memory in which a program driven by the processor is stored, wherein the processor drives the program to store serving spot information about a serving spot of each table to be served and serving zone information about each of a plurality of serving zones set previously based on movement paths along which the serving robots are movable, the serving zone information including information about a plurality of serving spots grouped in a predetermined manner, determine whether a plurality of performing robots among the serving robots are same-zone performing robots to serve in a same first serving zone based on the serving zone information, and change at least one serving table or serving order of the same-zone performing robots, when the plurality of performing robots are the same-zone performing robots as a result of the determination.

The processor may drive the program to determine whether a standby event occurs in at least one same-zone performing robot when serving is performed in serving order based on the serving order among the same-zone performing robots and change at least one serving table or the serving order of the same-zone performing robots when it is determined that the standby event occurs.

The processor may drive the program to substitutively allocate a replacement serving case that is a serving case included in a serving standby list and included in a serving zone different from the first serving zone to a first performing robot that is any one of the same-zone performing robots.

The processor may drive the program to register an original assigned serving case which is originally assigned to the first performing robot as a priority serving case of the serving standby list.

The processor may drive the program to select the replacement serving case based on a priority or frequency of the serving zone when there are a plurality of replacement candidate serving cases included in the different serving zone in the serving standby list.

The processor may drive the program to change a serving order of a first same-zone performing robot having a low priority serving order of the serving order among the same-zone performing robots to a serving order faster than at least one second same-zone performing robot having a higher priority serving order faster than the first same-zone performing robot.

The processor may drive the program to maintain information about at least one temporary standby zone in which the serving robot is able to temporarily stand for each serving zone and control the first same-zone performing robot to perform serving after moving the second same-zone performing robot to at least one first temporary zone corresponding to the first serving zone.

A multi serving robot operation system according to another aspect includes a processor and a memory in which a program driven by the processor is stored, wherein the processor drives the program to store serving spot information about a serving spot of each table to be served and serving zone information about each of a plurality of serving zones set previously based on movement paths along which the serving robots are movable, the serving zone information including information for identifying that, in the case that there is at least one second spot affected by movement when serving is performed at any one first serving spot included in a specific serving zone, the first serving spot and the at least one second serving spot are included in the specific serving zone, check a serving zone corresponding to each of a plurality of performing robots among the serving robots based on the serving zone information, and adaptively control at least one of movement paths or serving order of the plurality of performing robots based on a result of checking the serving zone corresponding to each of the plurality of performing robots.

Advantageous Effects

According to an example embodiment, there is an effect of preventing deterioration of service quality by allowing a plurality of serving robots to perform efficient serving when movement paths overlap among the plurality of serving robots that need to move simultaneously in the large store.

In particular, there is an effect of enabling effective operation of serving robots through the concept of a serving zone even in the case that if there is a serving robot performing serving, other serving robots may not move to a location corresponding to the serving robot due to overlap of moving paths, in other words, the nature of the moving paths.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 4:
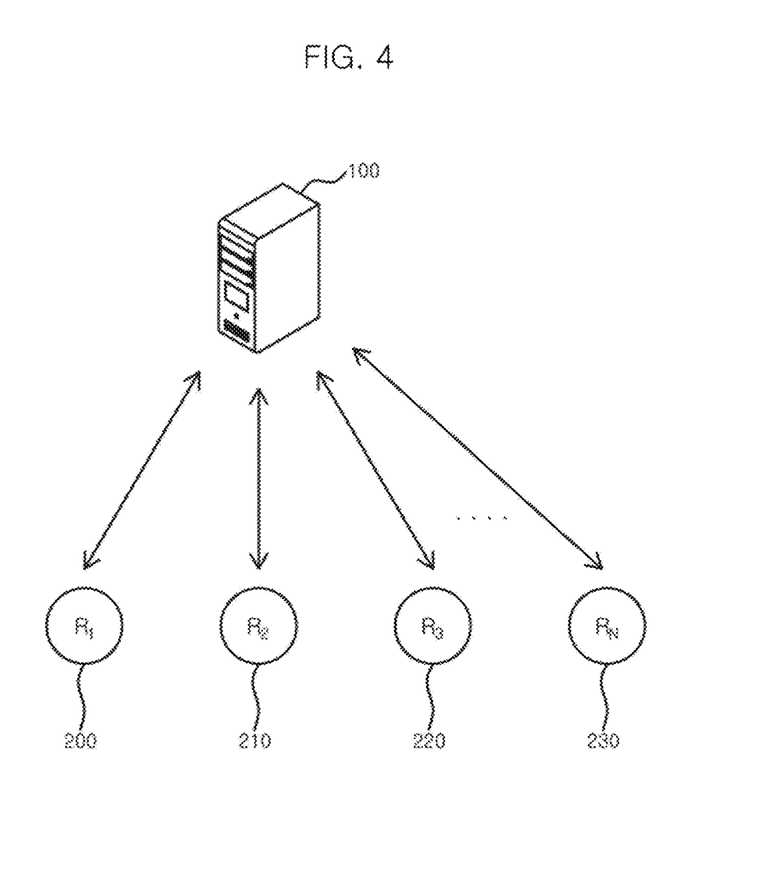
FIG. 4 is a diagram for exemplarily explaining systems for implementing a multi serving robot operation method according to an example embodiment.

FIG. 4 is a diagram for exemplarily explaining systems for implementing a multi serving robot operation method according to an example embodiment.

Referring to FIG. 4, a multi serving robot operation system 100 may be provided to implement the multi serving robot operation method according to an example embodiment.

According to a technical idea of the present disclosure, the multi serving robot operation system 100 may control each movement path, movement order, and/or table to be served of a plurality of serving robots (e.g., R1 200, R2 210, R3 220, . . . , RN 230).

To this end, the multi serving robot operation system 100 may perform predetermined communication with each of the serving robots (e.g., R1 200, R2 210, R3 220, . . . , RN 230), and the multi serving robot operation system 100 may transmit control signals to the serving robots (e.g., R1 200, R2 210, R3 220, . . . , RN 230) to control the serving of the serving robots to correspond to the control signal.

In addition, each of the serving robots (e.g., R1 200, R2 210, R3 220, . . . , RN 230) may transmit information about its own state, the progress status of the serving, etc. to the multi serving robot operation system 100.

Of course, communication may also be made between the serving robots (e.g., R1 200, R2 210, R3 220, . . . , RN 230) according to an example embodiment.

Although the multi serving robot operation system 100 is exemplarily implemented as a physical device (e.g., a server) separate from the serving robots (e.g., R1 200, R2 210, R3 220, . . . , RN 230) in FIG. 4, according to an example embodiment, the multi serving robot operation system 100 may be mounted on any one of the serving robots (e.g., R1 200, R2 210, R3 220, . . . , RN 230) to implement the technical idea of the present invention. In other words, one or a plurality of the serving robots (e.g., R1 200, R2 210, R3 220, . . . , RN 230) may perform the function of the multi serving robot operation system 100.

The multi serving robot operation system 100 may store and maintain/manage information on a movement path through which each of the serving robots (e.g., R1 200, R2 210, R3 220, . . . , RN 230) can move in order to implement the technical idea of the present invention.

The movement path may mean a path in space that each of the serving robots (e.g., R1 200, R2 210, R3 220, . . . , RN 230) can move, and various technical ideas capable of expressing information on such a movement path are widely known. For example, successive coordinate values in space may be set as information on a movement path, but the present invention is not limited thereto. In addition, the multi serving robot operation system 100 may store and maintain/manage information on tables to be served by the serving robots (e.g., R1 200, R2 210, R3 220, . . . , RN 230).

The information on the table may include identification information for each table and/or location information for each table.

In addition, the multi serving robot operation system 100 may store and maintain/manage information on a serving spot for each table.

The serving spot may mean a location where the serving robot stops for each table to perform serving. The information on the serving spot includes information on the location of the serving spot, and may further include information on whether another serving robot can move via the serving spot when a predetermined serving robot is serving at the serving spot according to an example embodiment.

For example, when a serving robot 3 in FIG. 2 is serving at a serving spot corresponding to Table C, other serving robots 1, 2 may not be able to move via the serving spot.

In the present specification, such a case is defined as overlapping of movement paths, and the multi serving robot operation system 100 may separately store and maintain/manage information on whether or not the overlapping of movement paths occurs for each serving spot, or may maintain/manage it by including it in the information on the serving spot.

By this, the multi serving robot operation system 100 may store and maintain/manage information on at least one serving zone.

The serving zone may be information obtained by grouping serving spots (or tables) in a predetermined manner.

For example, the serving zone information may be information grouping serving spots that affect the movement of the serving robot.

For example, a first serving spot and at least one second serving spot may be included in a serving zone when there is at least one second serving spot affected by movement when serving is performed at any one first serving spot included in a specific serving zone.

Here, being affected by movement may include a case in which movement paths overlap as described above.

According to an example embodiment, even if the movement paths do not necessarily overlap (that is, if any one serving robot is serving, other serving robots can pass through the corresponding point), if there are serving spots that must move the same specific section on the movement path for the serving robot to serve, these serving spots may be grouped into the same serving zone. For example, serving spots corresponding to tables A, B, C, respectively, in FIG. 2 may be locations that can be served only by using the same movement path section even if the movement paths do not overlap. Since these locations, in other words, the serving spots may be locations that may be restricted in movement when the serving robots move at the same time, they may be grouped into one serving zone.

In any case, the serving zone may be set as a set of serving spots that require additional control when serving occurs at the same time or where serving robots (e.g., R1 200, R2 210, R3 220, . . . , RN 230) can be dense.

Then, the multi serving robot operation system 100 may specify a serving zone in the entire store to be served in order to effectively operate a plurality of serving robots (e.g., R1 200, R2 210, R3 220, . . . , RN 230) and may adaptively control the serving of the serving robots (e.g., R1 200, R2 210, R3 220, . . . , RN 230) based on information on a specific serving zone.

According to one example, the multi serving robot operation system 100 may adaptively determine the serving order or the table to be served according to whether the table (or serving spot) to be served by the serving robots (e.g., R1

200, R2 210, R3 220, . . . , RN 230) is included in the same serving zone when a plurality of serving robots (e.g., R1 200, R2 210, R3 220, . . . , RN 230) need to serve simultaneously or sequentially within a certain time range. Adaptively determining the serving order or the table to be served may mean maintaining or changing the serving order or the table to be served already determined in a predetermined manner.

To this end, the multi serving robot operation system 100 may simulate serving in advance when a predetermined serving order exists between serving robots (e.g., R1 200, R2 210, R3 220, . . . , RN 230) and a serving table is allocated for each serving robots (e.g., R1 200, R2 210, R3 220, . . . , RN 230). And the serving order or the table to be served may be adaptively changed when all or some of the serving robots (e.g., R1 200, R2 210, R3 220, . . . , RN 230) serve in the same serving zone and a predetermined situation occurs as a result of the simulation (e.g., if there is a serving robot that needs to stop moving and stand by).

After all, according to the technical idea of the present invention, it is possible to effectively set a serving zone for all stores served by the serving robots (e.g., R1 200, R2 210, R3 220, . . . , RN 230), and to effectively control the serving of a plurality of serving robots based on the set serving zone.

Figure 5:
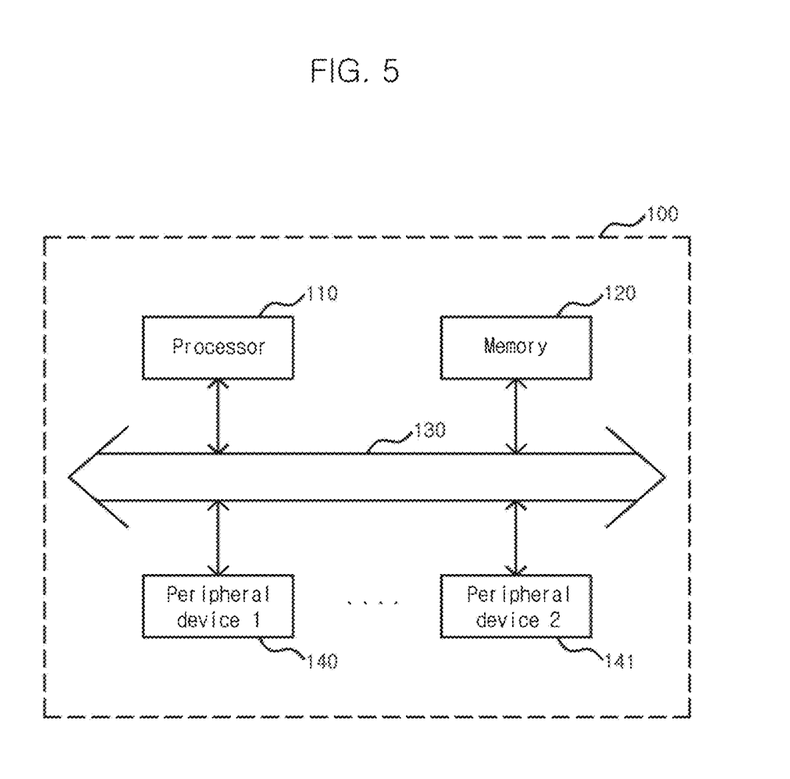
FIG. 5 is a diagram for explaining a schematic configuration of a multi serving robot operation system according to an example embodiment.

A schematic configuration of the multi serving robot operation system 100 for implementing this technical idea may be as shown in FIG. 5.

FIG. 5 is a diagram for explaining a schematic configuration of a multi serving robot operation system according to an example embodiment.

Referring to FIG. 5, the multi serving robot operation system 100 may be implemented as a predetermined data processing device.

As described above, the multi serving robot operation system 100 may be implemented as a separate server that communicates with the serving robots (e.g., R1 200, R2 210, R3 220, . . . , RN 230).

Alternatively, the multi serving robot operation system 100 may be installed in at least one of the serving robots (e.g., R1 200, R2 210, R3 220, . . . , RN 230).

The multi serving robot operation system 100 includes a processor 110 and a storage medium (or memory, 120) for implementing the functions defined herein as shown in FIG. 5. The processor 110 may refer to an arithmetic device capable of executing a predetermined program (software code), and may be named by various names such as an implementation example of the data processing device or a vendor mobile processor, microprocessor, CPU, single processor, multiprocessor, GPU, and may be implemented by one or more processors.

An average expert in the technical field of the present invention can easily infer that the processor 110 can perform data processing necessary for the technical idea of the present invention by driving the program.

The memory 120 may refer to a device in which a program for implementing the technical idea of the present invention is stored/installed. According to an example embodiment, the memory 120 may be divided into a plurality of different physical devices, and a part of the memory 120 may exist inside the processor 110 according to an embodiment. The memory 120 may be implemented as a hard disk, GPU, a solid state disk (SSD), optical disk, a random access memory (RAM), and/or other various types of storage media according to an example embodiments, and may be implemented in a detachable method in the memory 120 if necessary.

The multi serving robot operation system 100 may be implemented as an independent server, but is not limited thereto and may be implemented with any data processing device (e.g., computer, mobile terminal, etc.) having data processing capability to execute the program while communicating with the serving robots (e.g., R1 200, R2 210, R3 220, . . . , RN 230).

In addition, an average expert in the art of the present invention can easily infer that the multi serving robot operation system 100 may be provided with the processor 110, the memory 120, and various peripheral devices (e.g., an input/output device, a display device, an audio device, etc., 140, 141), and a communication interface (e.g., a communication bus 130 etc.) for connecting these devices.

On the other hand, the average expert in the art of the present invention can easily infer that the multi serving robot operation system 100 according to the technical idea of the present invention may be implemented by organically combining the program (or software) stored in the memory 120 and the processor 110, and, hereinafter, the function and/or operation performed by the multi serving robot operation system 100 in the present specification may be achieved by executing the program by the processor 110.

As described above, the multi serving robot operation system 100 may store serving spot information for each serving spot for each of the tables to be served by the serving robots (e.g., R1 200, R2 210, R3 220, . . . , RN 230) and serving zone information for each of the serving zones.

The serving zone may be a plurality of serving spots grouped in a predetermined manner as needed to control serving.

According to an embodiment of the present invention, as described above, the serving zone may be a group of serving spots including a first serving spot and at least one second serving spot may be included in a serving zone when there is at least one second serving spot affected by movement when serving is performed at any one first serving spot included in a specific serving zone. Also, the at least one second serving spot affected by movement may mean a serving spot where movement paths overlap when serving is being performed at the first serving spot.

However, various serving zones may be set according to embodiments.

Figure 6:
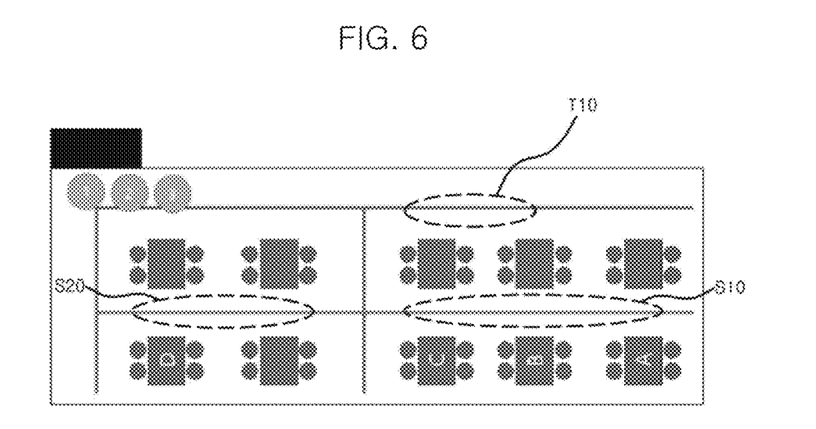
FIG. 6 is a diagram for explaining the concept of a serving zone according to an example embodiment.

FIG. 6 is a diagram for explaining the concept of a serving zone according to an example embodiment.

As shown in FIG. 6, the multi serving robot operation system 100 may set a plurality of serving zones S10, S20, and may store and maintain/manage information on each of these serving zones S10, S20.

A first serving zone S10 may be set to tables A, B, C (or serving spots corresponding to them). Also, a second serving zone S20 may be set to tables D, E (or serving spots corresponding to them).

In addition, the multi serving robot operation system 100 may change the information on these serving zones S10, S20 as needed. For example, the manager may determine a set of tables that are determined to cause issues for various reasons (people's movement, congestion, etc.) when serving is simultaneously or within a predetermined time while operating the serving zone S10, S20, and may set the set of tables as one serving zone.

Information on the newly set serving zone may be input to the multi serving robot operation system 100, then the multi serving robot operation system 100 may receive information on the new serving zone and update the existing serving zone information.

Meanwhile, the multi serving robot operation system 100 may store and maintain/manage information on a predetermined temporary standby zone T10 as will be described later. One or a plurality of temporary standby zones T10 may be set for each serving zone.

The temporary standby zone T10 may be an area in which all or some of a plurality of performing robots are set to temporarily stand by when the plurality of performing robots are to perform serving in a predetermined serving zone, as will be described later.

The temporary standby zone T10 may be utilized when changing the serving order of the performing robots, and may be set at an appropriate location for each serving zone.

In this way, in a state in which information on the serving zones S10, S20 and/or information on the temporary standby zone T10 is set, the multi serving robot operation system 100 may control a plurality of performing robots that are all or part of serving robots (e.g., R1 200, R2 210, R3 220, ..., RN 230) to start serving.

In this case, the performing robots may be serving robots that start moving for serving at the same time or start moving within a preset time interval.

The performing robots may have serving order determined as described above.

For example, as described with reference to FIG. 1 to FIG. 3, the serving robots wait to load food at a predetermined location, and the serving robots may be set as performing robots when food is loaded and a table is assigned. And between the performing robots, the serving order may be automatically or artificially set according to the location on the movement path (e.g., in the order in front of the movement path), the loading order of food, and the like. For example, in the case of FIG. 1 to FIG. 3, the serving order of the serving robot 3, the serving robot 2, and the serving robot 1 may be faster.

The multi serving robot operation system 100 may specify performing robots among a plurality of serving robots (e.g., R1 200, R2 210, R3 220, ..., RN 230).

As described above, the performing robots may be serving robots that start serving at the same time or within a predetermined time, or at least serving robots loaded with food and assigned a table.

Table allocation may be allocated to the serving robots in the order in which the food comes out, or may be allocated sequentially according to the standby locations of the serving robots.

When food is loaded and table are assigned to the serving robots in various ways, the multi serving robot operation system 100 may specify the performing robots and may determine whether the performing robots are same-zone performing robots to serve in the same serving zone. Determining whether the performing robots are the same-zone performing robots to serve in the same serving zone may include determining which robot is the same-zone performing robots among the performing robots.

Then, the multi serving robot operation system 100 may adaptively select a serving strategy for the same-zone performing robots. The selection of the adaptive serving strategy may mean changing serving order and/or a serving table currently set for at least one of the same-zone performing robots as needed.

For example, when serving is performed on each assigned table in the serving order among the same-zone performing robots currently set, the multi serving robot operation system 100 may determine in advance whether a standby event occurs for at least one same-zone performing robot.

The standby event may refer to a case in which the performing robot waits without moving to a serving spot to be served due to overlapping of movement paths as described above.

Then, the multi serving robot operation system 100 may change the serving table or the serving order of at least one of the same-zone performing robots when it is determined that a standby event occurs.

An example of changing at least one serving table among the same-zone performing robots will be described with reference to FIG. 7 to FIG. 9.

Figure 7:
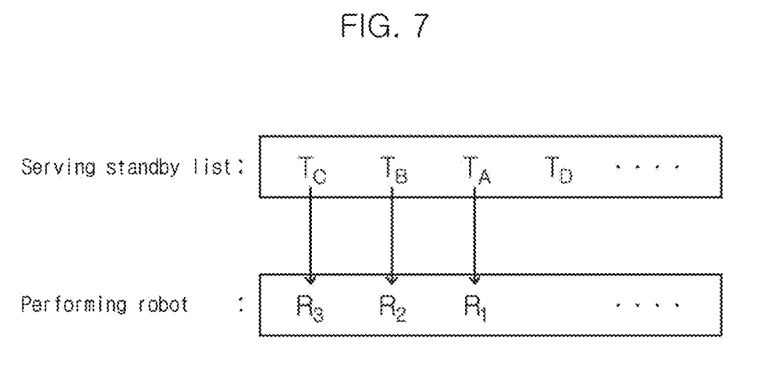
FIG. 7 to FIG. 9 are diagrams for explaining the concept of changing serving tables according to an example embodiment.
Figure 8:
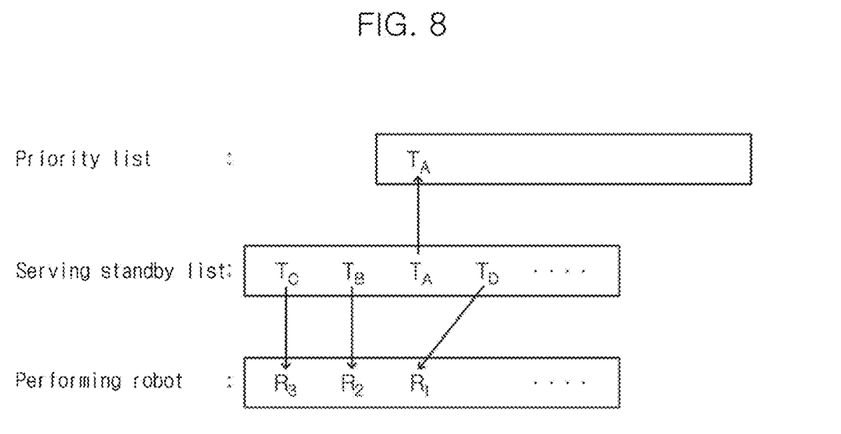
Figure 9:
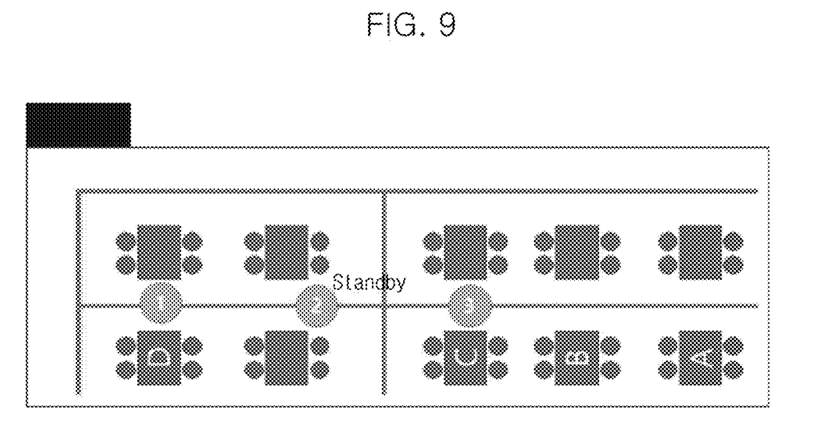

FIG. 7 to FIG. 9 are diagrams for explaining the concept of changing servings table according to an example embodiment.

First, referring to FIG. 7, the multi serving robot operation system 100 may maintain a serving standby list waiting to be served and a list of standby serving robots. Further, a serving robot may become the performing robot when any one of the serving cases included in the serving standby list is assigned to the serving robot.

First, the multi serving robot operation system 100 may allocate each of the serving cases TC, TB, TA, TD included in the serving standby list to the standby serving robots R3, R2, R1 according to a predetermined criterion. This allocation may be a way in which a serving robot having a fast serving order is sequentially assigned a serving case with a fast priority, but is not limited thereto, and the serving case may be assigned in various ways.

Also, each of the serving cases TC, TB, TA, TD may be a case to be served in tables C, B, A, D.

Then, as shown in FIG. 7, the serving case TC may be assigned to the serving robot R3, the serving case TB may be assigned to the serving robot R2, and the serving case TA may be assigned to the serving robot R1. The serving case TD may not be assigned because there is no standby serving robot, or may be assigned to another serving robot. Hereinafter, for convenience of explanation, a case in which three serving robots exist is described, and a case in which the serving case TD has not yet been assigned will be described, but the scope of the present invention is not limited thereto.

In order to start serving after a serving case is assigned, the multi serving robot operation system 100 may determine whether the performing robots R3, R2, R1 are the same-zone performing robots. To this end, the multi serving robot operation system 100 may check information on a serving table and a serving zone of serving cases assigned to each of the performing robots R3, R2, R1.

Further, since all of the serving tables of the serving cases TC, TB, TA to be served by the performing robots R3, R2, R1 correspond to the first serving zone S10, the multi serving robot operation system 100 may determine that the performing robots R3, R2, R1 are the same-zone performing robots.

Then, the multi serving robot operation system 100 may change the serving table of any one (e.g., R1) of the same-zone performing robots (R3, R2, R1).

For example, the multi serving robot operation system 100 may change the serving table of the performing robot R1 to D. In other words, the serving case may be replaced with the serving case TD from the originally allocated serving case TA.

In this case, the replacing serving case, in other words, a replacement serving case TD, may be a serving case corresponding to a serving zone different from the first serving zone S10 to be served by the same-zone performing robots R3, R2, R1.

To this end, the multi serving robot operation system 100 may select the replacement serving case (e.g., TD) among the serving cases included in the second serving zone (e.g., S20) different from the first serving zone S10 while being included in the serving standby list.

In addition, the replacement serving case (e.g., TD) may be replacemently allocated to the first performing robot (e.g., R1), which is one of the same-zone performing robots.

Various embodiments may be possible as to which performing robot among the same-zone performing robots R3, R2, R1 is assigned the replacement serving case.

For example, the multi serving robot operation system 100 may arbitrarily select a performing robot to serve a replacement serving case, may re-simulate the serving in the case of performing the replacement assignment, and may determine the performing robot to serve the replacement serving by sequentially proceeding the process of determining whether the standby time is reduced or the standby event does not occur as a result of the simulation.

On the other hand, the multi serving robot operation system 100 may put the original assigned serving case TA originally assigned to the first performing robot R1 to serve the replacement serving case TD into the non-allocated serving standby list.

At this time, the multi serving robot operation system 100 may register the original assigned serving case TA as a priority serving case of the serving standby list as shown in FIG. 8.

In other words, the multi serving robot operation system 100 may give priority among serving cases included in the serving standby list, and by registering the original assignment serving case TA as a serving case to be served preferentially in principle, the original assignment serving case TA may be treated preferentially when serving the next serving robots.

Although FIG. 8 illustrates a case in which the serving standby list and the priority serving list are separately maintained/managed, according to an example embodiment, information on the priority may be recorded while only one of the serving standby list is maintained.

On the other hand, when performing robots R3, R2, R1 are determined to be the same-zone performing robots R3, R2, R1, there may be a plurality of serving cases corresponding to other serving zones S20 different from the serving zones S10 to be served by the same-zone performing robots R3, R2, R1, in other words, a plurality of candidate replacement serving cases.

In this case, the multi serving robot operation system 100 may first determine a serving case registered as a priority among a plurality of candidate replacement serving cases as a replacement serving case.

Alternatively, the multi serving robot operation system 100 may determine in which serving zone each of the candidate replacement serving cases and/or the current serving cases are included, and may select an replacement serving case according to serving zone frequency derived as a result of the determination.

For example, a plurality of candidate replacement serving cases may exist, and the number of serving cases corresponding to the second serving zone and the number of serving cases corresponding to the third serving zone may be determined among the candidate replacement serving cases.

Here, the multi serving robot operation system 100 may select any one of the candidate replacement serving cases corresponding to the serving zone having a higher frequency as the replacement serving case, and select a strategy to increase the serving efficiency in the next serving step.

Alternatively, the multi serving robot operation system 100 may select a replacement case such that the serving cases to be performed in the current step are not concentrated in any one serving zone in consideration of the serving zone frequency of the serving cases to be performed in the current step.

For example, there are currently three serving zones, and in the serving of the current step, there are three serving cases corresponding to the first serving zone, two servings cases corresponding to the second serving zone, and zero serving cases corresponding to the third serving zone. And when the five performing robots in the current step process the assigned serving case, the multi serving robot operation system 100 may substitute the serving case for the same-zone performing robots to perform serving in the first serving zone, and in the candidate replacement serving cases, a case corresponding to the second serving zone and a case corresponding to the third serving zone may exist, respectively. In this case, the multi serving robot operation system 100 may reduce the risk of occurrence of congestion or standby events in other serving zones by selecting the serving case corresponding to the third serving zone as a replacement serving case.

Of course, which serving case of the candidate replacement serving cases is selected as the replacement serving case may be considered together the priority and serving zone frequency, as described above, and an average expert in the technical field of the present invention can easily infer that various embodiments are possible.

When a replacement serving case TD is assigned instead of the original assigned serving case TA to the first performing robot R1, as shown in FIG. 9, the third serving robot R3, which has the fastest serving order, is the serving TC can be served. And then, the second serving robot R2, which has the fastest serving order, must wait, but the first serving robot R1, which is the last serving order, can process the replacement serving case TD.

In this case, there is an effect that the standby time can be reduced compared to serving the originally allocated serving cases in the original serving order.

On the other hand, the multi serving robot operation system 100 may change the serving table (serving case) of at least one of the same-zone performing robots R3, R2, R1, but may select a strategy for changing the serving order.

Such an example will be described with reference to FIG. 10 to FIG. 12.

Figure 10:
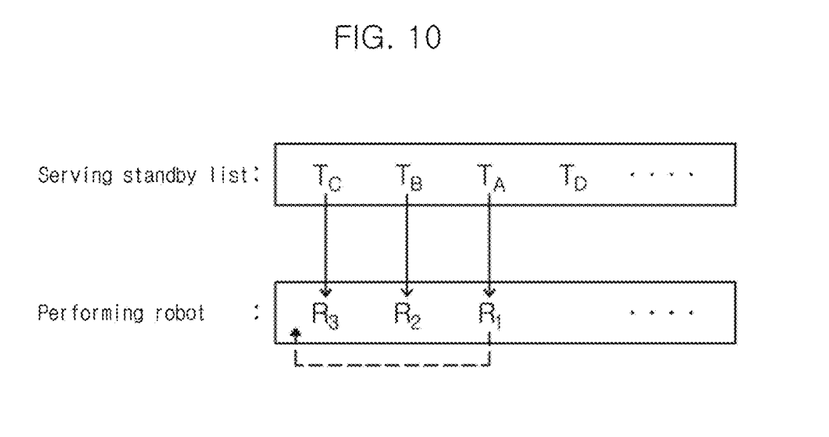
FIG. 10 to FIG. 12 are diagrams for explaining the concept of changing serving order among serving robots according to an example embodiment.
Figure 11:
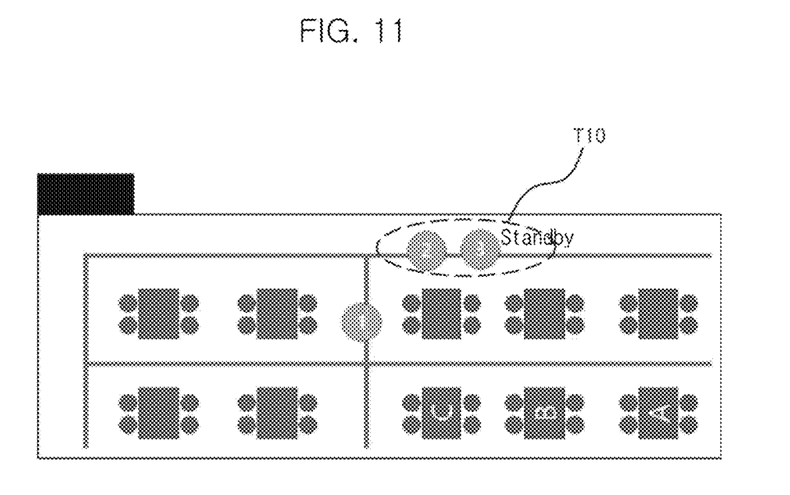
Figure 12:
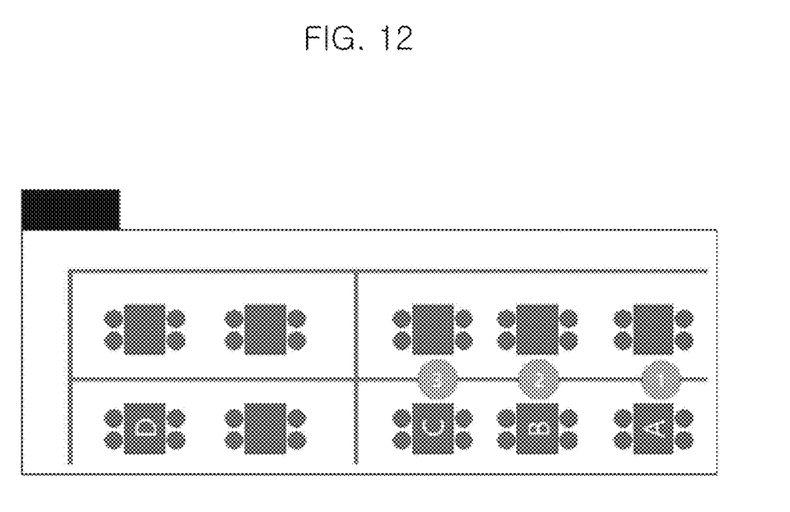

FIG. 10 to FIG. 12 are diagrams for explaining the concept of changing serving order among serving robots according to an example embodiment.

First, referring to FIG. 10, the serving case TC may be assigned to the serving robot R3, the serving case TB may be assigned to the serving robot R2, and the serving case TA may be assigned to the serving robot R1.

In addition, it may be determined whether the serving robots to which the serving cases are assigned, in other words, the performing robots R3, R2, R1, are the same-zone performing robots. Since they are the same-zone performing robots as a result of the determination, the multi serving robot operation system 100 may change the serving order of the first same-zone performing robot (e.g., R1) having a low priority serving order to a serving order faster than at least one second same-zone performing robot (e.g., R2, R3) having a higher priority serving order than the first same-zone performing robot.

In addition, the second performing robot R2 may also be changed to a faster serving order than the third performing robot R3.

If there is no constraint on the movement path, the multi serving robot operation system 100 may change the serving order by simply controlling the performing robots to sequentially start moving for serving in the changed order.

However, according to the embodiment, depending on the standby location of each of the standby serving robots and the limitation of the number of robots that can move simultaneously on the corresponding movement path, there may be a constraint that the serving robot standby at the back cannot move first.

In this case, the multi serving robot operation system 100 may use the temporary standby zone T10 allocated for each serving zone, if necessary, in order to change the serving order.

For example, as shown in FIG. 11, when the serving order is changed so that the first performing robot R1 has the fastest serving order, the multi serving robot operation system 100 may sequentially move the third performing robot R3 and the second performing robot R2 in the temporary standby zone T10 preset to correspond to the first serving zone S10 to be served.

After that, the multi serving robot operation system 100 may move the first performing robot R1 to the serving table, then may move the second performing robot R2 having the next serving order to the table to be served, and finally may move the third performing robot R3 having to the table to be served.

Then, as shown in FIG. 12, the performing robots R3, R2, R1 may perform serving without a standby event occurring through the serving progress of the performing robot with a fast serving order. Of course, a little standby may occur when the performing robots enter the temporary standby zone T10 and the serving order is changed, but this may be at a very small level compared to the standby time caused by arriving at the serving spot and proceeding with the serving.

Of course, at least one temporary standby zone T10 may be set for each serving zone, and the temporary standby zone T10 may be set at a predetermined location where the serving order may be changed after entering.

Consequently, according to the technical idea of the present disclosure, when a plurality of serving robots need to move to perform serving simultaneously or sequentially, there is an effect that an efficient serving strategy may be adaptively selected by applying and utilizing the concept of the serving zone.

The foregoing description of the present disclosure is for illustration, and those skilled in the art to which the present disclosure pertains can understand that modifications into other specific forms may be easily made without changing the technical spirit or essential features of the present disclosure. Therefore, it should be understood that the example embodiments described above are illustrative in all respects and not restrictive. For example, each component described as a single type may be implemented in a distributed manner, and components described as distributed may be implemented in a combined form.

The scope of the present disclosure is indicated by the appended claims rather than the above detailed description, and all changes or modifications derived from the meaning and scope of the claims and their equivalent concepts should be construed as being included in the scope of the present disclosure.

INDUSTRIAL APPLICABILITY

The present disclosure may be used in a multi serving robot operation method and a multi serving robot operation system.

Although certain embodiments and implementations have been described herein, other embodiments and modifications will be apparent from this description. Accordingly, the inventive concepts are not limited to such embodiments, bur rather to the broader scope of the appended claims and various obvious modifications and equivalent arrangements as would be apparent to a person of ordinary skill in the art.

The invention claimed is:

1. A method of operating serving robots, the method comprising:
   storing, by a multi serving robot operation system, serving spot information about a serving spot of each table to be served and serving zone information about each of a plurality of serving zones set previously based on movement paths along which the serving robots are movable, the serving zone information including information about a plurality of serving spots grouped in a predetermined manner;
   determining, by the multi serving robot operation system, whether a plurality of performing robots among the serving robots are same-zone performing robots to serve in a same first serving zone based on the serving zone information; and
   changing, by the multi serving robot operation system, at least one serving table or serving order of the same-zone performing robots, when the plurality of performing robots are the same-zone performing robots as a result of the determination.

2. The method of claim 1, wherein the serving zone information indicates information obtained by grouping serving spots in the case that there is at least one second spot affected by movement when serving is performed at any one first serving spot included in a specific serving zone, and the serving spots comprise the first serving spot and the at least one second serving spot.

3. The method of claim 1, further comprising:
   determining, by the multi serving robot operation system, whether a standby event occurs in at least one same-zone performing robot when serving is performed in serving order based on the serving order among the same-zone performing robots,
   wherein at least one serving table or the serving order of the same-zone performing robots is changed when it is determined that the standby event occurs.

4. The method of claim 1, wherein the changing of the at least one of the serving table or the serving order of the same-zone performing robots comprises,
   substitutively allocating, by the multi serving robot operation system, a replacement serving case that is a serving case included in a serving standby list and included in a serving zone different from the first serving zone to a first performing robot that is any one of the same-zone performing robots.

5. The method of claim 4, further comprising:
   registering, by the multi serving robot operation system, an original assigned serving case which is originally assigned to the first performing robot as a priority serving case of the serving standby list.

6. The method of claim 4, wherein the substitutively allocating, by the multi serving robot operation system, of the replacement serving case that is a serving case included in the serving standby list and included in the serving zone different from the first serving zone to the first performing robot that is any one of the same-zone performing robots comprises,
   selecting the replacement serving case based on a priority or frequency of the serving zone when there are a plurality of replacement candidate serving cases included in the different serving zone in the serving standby list.

7. The method of claim 1, wherein the changing, by the multi serving robot operation system, of the at least one serving table or the serving order of the same-zone performing robots, when the plurality of performing robots are the same-zone performing robots as a result of the determination comprises, changing a serving order of a first same-zone performing robot having a low priority serving order of the serving order among the same-zone performing robots to a serving order faster than at least one second same-zone performing robot having a higher priority serving order faster than the first same-zone performing robot.

8. The method of claim 7, further comprising:

maintaining, by the multi serving robot operation system, information about at least one temporary standby zone in which the serving robot is able to temporarily stand for each serving zone, wherein the changing of the serving order of the first same-zone performing robot having the low priority serving order of the serving order among the same-zone performing robots to the serving order faster than the at least one second same-zone performing robot having the higher priority serving order faster than the first same-zone performing robot comprises, controlling, by the multi serving robot operation system, the first same-zone performing robot to perform serving after moving the second same-zone performing robot to at least one first temporary zone corresponding to the first serving zone.

9. A computer program installed in a data processing apparatus and stored in a non-transitory computer-readable recording medium for performing the method according to any one of claim 1.

10. A method of operating serving robots, the method comprising:

storing, by a multi serving robot operation system, serving spot information about a serving spot of each table to be served and serving zone information about each of a plurality of serving zones set previously based on movement paths along which the serving robots are movable, the serving zone information including information for identifying that, in the case that there is at least one second spot affected by movement when serving is performed at any one first serving spot included in a specific serving zone, the first serving spot and the at least one second serving spot are included in the specific serving zone;

checking, by the multi serving robot operation system, a serving zone corresponding to each of a plurality of performing robots among the serving robots based on the serving zone information; and adaptively controlling, by the multi serving robot operation system, at least one of movement paths or serving order of the plurality of performing robots based on a result of checking the serving zone corresponding to each of the plurality of performing robots.

11. A multi serving robot operation system, comprising:
a processor; and
a memory in which a program driven by the processor is stored,
wherein the processor drives the program to:
store serving spot information about a serving spot of each table to be served and serving zone information about each of a plurality of serving zones set previously based on movement paths along which the serving robots are movable, the serving zone information including information about a plurality of serving spots grouped in a predetermined manner;
determine whether a plurality of performing robots among the serving robots are same-zone performing robots to serve in a same first serving zone based on the serving zone information; and
change at least one serving table or serving order of the same-zone performing robots, when the plurality of performing robots are the same-zone performing robots as a result of the determination.

12. The multi serving robot operation system of claim 11, wherein the processor drives the program to determine whether a standby event occurs in at least one same-zone performing robot when serving is performed in serving order based on the serving order among the same-zone performing robots and change at least one serving table or the serving order of the same-zone performing robots when it is determined that the standby event occurs.

13. The multi serving robot operation system of claim 11, wherein the processor drives the program to substitutively allocate a replacement serving case that is a serving case included in a serving standby list and included in a serving zone different from the first serving zone to a first performing robot that is any one of the same-zone performing robots.

14. The multi serving robot operation system of claim 13, wherein the processor drives the program to register an original assigned serving case which is originally assigned to the first performing robot as a priority serving case of the serving standby list.

15. The multi serving robot operation system of claim 13, wherein the processor drives the program to select the replacement serving case based on a priority or frequency of the serving zone when there are a plurality of replacement candidate serving cases included in the different serving zone in the serving standby list.

16. The multi serving robot operation system of claim 13, wherein the processor drives the program to change a serving order of a first same-zone performing robot having a low priority serving order of the serving order among the same-zone performing robots to a serving order faster than at least one second same-zone performing robot having a higher priority serving order faster than the first same-zone performing robot.

17. The multi serving robot operation system of claim 16, wherein the processor drives the program to maintain information about at least one temporary standby zone in which the serving robot is able to temporarily stand for each serving zone and control the first same-zone performing robot to perform serving after moving the second same-zone performing robot to at least one first temporary zone corresponding to the first serving zone.

18. A multi serving robot operation system, comprising:
a processor; and
a memory in which a program driven by the processor is stored,
wherein the processor drives the program to:
store serving spot information about a serving spot of each table to be served and serving zone information about each of a plurality of serving zones set previously based on movement paths along which the serving robots are movable, the serving zone information including information for identifying that, in the case that there is at least one second spot affected by movement when serving is performed at any one first serving spot included in a specific serving zone, the first serving spot and the at least one second serving spot are included in the specific serving zone;

check a serving zone corresponding to each of a plurality of performing robots among the serving robots based on the serving zone information; and adaptively control at least one of movement paths or serving order of the plurality of performing robots based on a result of checking the serving zone corresponding to each of the plurality of performing robots.

* * * * *

UNITED STATES PATENT AND TRADEMARK OFFICE
CERTIFICATE OF CORRECTION

| | | |
|---|---|---|
| PATENT NO. | : 12,172,294 B2 | Page 1 of 1 |
| APPLICATION NO. | : 17/913837 | |
| DATED | : December 24, 2024 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 172 days.

Signed and Sealed this
Fifteenth Day of July, 2025

Coke Morgan Stewart
*Acting Director of the United States Patent and Trademark Office*